(12) United States Patent
Kimura et al.

(10) Patent No.: US 10,753,438 B2
(45) Date of Patent: Aug. 25, 2020

(54) LIFTING DRIVE DEVICE AND MEASURING MACHINE USING THE SAME

(71) Applicant: MITUTOYO CORPORATION, Kanagawa (JP)

(72) Inventors: Yoshiharu Kimura, Tochigi (JP); Yoshikazu Ooyama, Tochigi (JP); Kazuaki Kawarai, Tochigi (JP)

(73) Assignee: MITUTOYO CORPORATION, Kanagawa (JP)

( * ) Notice: Subject to any disclaimer, the term of this patent is extended or adjusted under 35 U.S.C. 154(b) by 201 days.

(21) Appl. No.: 15/906,558

(22) Filed: Feb. 27, 2018

(65) Prior Publication Data
US 2018/0252302 A1 Sep. 6, 2018

(30) Foreign Application Priority Data
Mar. 2, 2017 (JP) ................. 2017-039060

(51) Int. Cl.
| | |
|---|---|
| *G01B 5/008* | (2006.01) |
| *F16H 19/02* | (2006.01) |
| *F16M 13/02* | (2006.01) |
| *F15B 15/14* | (2006.01) |
| *G01B 5/012* | (2006.01) |
| *G01B 5/20* | (2006.01) |
| *G01B 11/24* | (2006.01) |
| *G01B 11/00* | (2006.01) |

(52) U.S. Cl.
CPC .......... *F16H 19/025* (2013.01); *F15B 15/14* (2013.01); *F16M 13/022* (2013.01); *G01B 5/008* (2013.01); *G01B 5/012* (2013.01); *G01B 5/20* (2013.01); *F16H 2712/06* (2013.01); *F16M 2200/04* (2013.01); *G01B 11/005* (2013.01); *G01B 11/24* (2013.01)

(58) Field of Classification Search
CPC ...................................... G01B 5/008
USPC ......................................... 33/503
See application file for complete search history.

(56) References Cited

U.S. PATENT DOCUMENTS

| | | | | |
|---|---|---|---|---|
| 3,784,743 | A | * 1/1974 | Schroeder | ......... H04L 25/03872 380/46 |
| 4,213,244 | A | * 7/1980 | Bell | ......... B23Q 1/28 188/170 |
| 4,389,781 | A | * 6/1983 | Donaldson | ......... G01B 5/0016 33/1 M |

(Continued)

FOREIGN PATENT DOCUMENTS

JP 3988860 7/2007

*Primary Examiner* — Christopher W Fulton
(74) *Attorney, Agent, or Firm* — Greenblum & Bernstein, P.L.C.

(57) ABSTRACT

A lifting drive device for a Z-axis spindle inserted into a guide tube and guided via an air layer including: a wire extending upward from the inside of the Z-axis spindle and having its upper end supported by the guide tube, a piston connected to an lower end of the wire, a cylinder that moves up-and-down relative to the piston by an air supplied to a cylinder chamber provided to the Z-axis spindle and partitioned by the piston, a driving roller provided to the guide tube and in contact with the surface of the Z-axis spindle, and a motor for driving the driving roller, so as to achieve highly precise linear movement and swift lifting of the Z-axis spindle guided by an air bearing and to be suitable for structural simplification, weight reduction and vibration countermeasures.

12 Claims, 4 Drawing Sheets

(56) References Cited

U.S. PATENT DOCUMENTS

| | | | | |
|---|---|---|---|---|
| 4,507,868 A | * | 4/1985 | Tuss | G01B 5/0016 |
| | | | | 33/1 M |
| 4,631,834 A | * | 12/1986 | Hayashi | G01B 5/008 |
| | | | | 33/1 M |
| 4,799,316 A | * | 1/1989 | Tuss | G01B 5/008 |
| | | | | 33/503 |
| 4,964,221 A | * | 10/1990 | Breyer | G01B 5/0016 |
| | | | | 33/1 M |
| 5,291,662 A | * | 3/1994 | Matsumiya | B23Q 1/012 |
| | | | | 33/1 M |
| 2011/0083334 A1 | * | 4/2011 | Eley | G01B 5/0002 |
| | | | | 33/503 |
| 2012/0072156 A1 | * | 3/2012 | Fukuda | G01B 5/0016 |
| | | | | 702/95 |

* cited by examiner

LIFTING DRIVE DEVICE AND MEASURING MACHINE USING THE SAME

RELATED APPLICATIONS

This application claims the priority of Japanese Patent Application No. 2017-39060 filed on Mar. 2, 2017, which is incorporated herein by reference.

FIELD OF THE INVENTION

The present invention relates to a moving mechanism of a measuring head used in a measuring machine.

BACKGROUND OF THE INVENTION

A measuring machine which has a probe mounted onto a measuring head and performs various measurements by bringing the probe close to a work from any direction comprises a lifting drive device for the measuring head in many cases. Probes such as a contact/non-contact probe, a high resolution camera, and the like are selectively mounted onto the measuring head in accordance with various measurements, and a position (coordinate), an image, a shape and the like of a work are measured with high precision by respective probes. Further, measurements are sometimes performed with a lighting apparatus mounted onto the measuring head to illuminate a part to be measured of a work by the lighting apparatus.

Japanese Patent No. 3988860 (hereinafter, Patent Literature 1) discloses a Z-direction drive mechanism which is a lifting drive device for a conventional measuring head. As shown in FIG. 5, this Z-direction drive mechanism comprises a Z-axis spindle 12 having a probe 13 at an lower end and supported vertically, a guide tube 22 for guiding the Z-axis spindle 12 in a vertical direction, a support shaft 28 extending upward from the inside of the Z-axis spindle 12, a pair of rollers 15, 16 provided to the Z-axis spindle 12 and interposing a support shaft 28 therebetween, and a driving motor 17 for rotationally driving the roller 15.

The guide tube 22 is supported by an X-slider 9 of an X-direction drive mechanism and moves in X-direction. The Z-axis spindle 12 is inserted into the guide tube 22, and a plurality of air pads 24 for a plurality of air bearings is arranged in a space between the Z-axis spindle 12 and the guide tube 22. The air pad 24 is arranged in the inner periphery of the guide tube 22 and forms an air bearing by jetting air to reduce friction resistance between the guide tube 22 and the Z-axis spindle 12. Further, a post 25 standing vertically upward is provided to the guide tube 22, and a horizontal beam 26 provided at an upper end of this post 25 supports the upper end of the support shaft 28.

A piston is connected to a lower end of the support shaft 28 inserted into the inside of the Z-axis spindle 12, and a cylinder for housing this piston is provided inside the Z-axis spindle 12. By supplying air into a cylinder chamber, a floating force acts on the cylinder. This floating force becomes push-up force corresponding to the weight of the Z-axis spindle 12, so that an apparent weight of the Z-axis spindle 12 is reduced. Such mechanism is referred to as an air balance mechanism herein.

To drive the Z-direction drive mechanism of Patent Literature 1, a motor 17 is driven to rotate a driving roller 15. The driving roller 15 and a driven roller 16 interpose the support shaft 28 suspending the Z-axis spindle 12, so that the rollers 15, 16 lift while rotating by the friction force between the rollers 15, 16 and the support shaft 28. Accordingly, the Z-axis spindle 12 moves up-and-down, and the probe 13 can be set at a desired height.

PRIOR ART LITERATURES

Patent Literature

PATENT LITERATURE 1: Japanese Patent No. 3988860

DISCLOSURE OF THE INVENTION

Problem to be Solved by the Invention

In measuring machines such as a coordinate measuring machine, performance capable of moving and locating the measuring head, which holds the probe, with high precision and at high speed in any direction of X-, Y-, and Z-axis is important, and maintaining such performance over a long period is also required. Therefore, in the lifting drive devices for measuring heads, linear movement and swift operation performance of the Z-axis spindle is important. Although an air bearing, an air balance mechanism and a friction drive mechanism interposing a support shaft between a pair of rollers are adopted for the Z-direction drive mechanism of Patent Literature 1 for exhibiting such performance, further suitability for structural simplification, weight reduction, and vibration countermeasures is required.

For example, the Z-direction drive mechanism of Patent Literature 1 comprises a pair of rollers interposing a support shaft extended in a vertical direction, and moves the Z-axis spindle along the support shaft by the driving force of the rollers. To generate a predetermined amount of friction force between the rollers and the support shaft, contact area between the support shaft and each roller had to be ensured, and a support shaft having a large cross section was used. Thus, size reduction of the support shaft was limited.

Further, as a countermeasure of the Z-axis spindle vibrating even in a slight amount when the measuring head is moved in various directions, the Z-direction drive mechanism of Patent Literature 1 comprises a thrust bearing provided at an upper end of the support shaft suspending the Z-axis spindle to actively damp vibrations of the Z-axis spindle in many cases. However, providing the thrust bearing at the upper end of the support shaft is required as a countermeasure of vibrations, but it makes the structure of the Z-direction drive mechanism complicated.

The object of the present invention is to provide a lifting drive device for a measuring head that can achieve highly precise linear movement and swift lifting of a lifting member (Z-axis spindle) guided by an air bearing, and is suitable for structural simplification, weight reduction, and vibration countermeasures.

Means to Solve the Problem

To achieve the above-mentioned object, a lifting drive device according to the present invention is a lifting drive device of a lifting member guided by a guide member via an air layer and comprises:

a linear member extending upward from the lifting member and having its upper end supported by the guide member;

a balancer for enhancing tension which acts on the linear member to reduce an apparent weight of the lifting member suspended by the linear member;

at least one roller provided to the guide member and in contact with the lifting member; and a rotation driver for rotating the roller.

According to this configuration, the balancer of the lifting drive device enhances tension of the linear member suspending the lifting member and pulls up the lifting member by the enhanced tension, so that the apparent weight of the lifting member can be reduced. Specific examples of the balancer include an air balance mechanism using an air cylinder, a mechanism using a winch to wind up the wire, which is the linear member, and the like. The self-weight of the lifting member is canceled by the balancer and the driving force required for lifting the lifting member becomes small, so that the configuration becomes advantageous for swift lifting. Further, the lifting drive device of the present invention forms an air layer between the lifting member and the guide member and guides the lifting member up-and-down by the so-called air bearing. Since an abrasion portion between the lifting member and the guide member is eliminated, a highly precise linear movement of the lifting member can be maintained over a long period.

In addition, the lifting drive device of the present invention comprises a roller in direct contact with the surface of the lifting member that lifts the lifting member by its friction force. It is not a conventional friction drive mechanism for a suspension member, but it is a friction drive mechanism for the lifting member. As a result, the linear member for suspending the lifting member can be thinned to the minimum necessary thinness, and a linear member having flexibility became adoptable. It was necessary to provide a thrust bearing at an upper end of a support shaft for relatively large rigid suspension member like the conventional support shaft, however, the trust bearing can be eliminated if a linear member that is flexible to bending and twisting like the present invention is used as the suspension member. Examples of the linear member include a wire, a piano wire, a rope, a thin stick and the like. In particular, it is preferable that the linear member is a flexible wire or a thin stick.

On the other hand, in a configuration which merely adopts the linear member as the suspension member of the lifting member to eliminate the thrust bearing at the upper end, the natural frequency of the lifting member becomes small and the lifting member becomes easily vibrated compared to conventional configurations. In contrast, the lifting drive device of the present invention adopts the linear member and, at the same time, at least one roller that frictionally drives the lifting member directly. The roller is in contact with the lifting member at all times, so that the natural frequency of the lifting member will not be lowered and vibration of the same can be suppressed. Even if vibration is generated, vibration can be easily damped because the contact with the roller is maintained.

It is preferable that the at least one roller is in a pair and arranged to interpose the lifting member. To generate friction force between the lifting member and the roller, force to push the driving roller against the lifting member is necessary. However, in the lifting drive device of the present invention, the lifting member is guided by the air bearing, so that a push-back force to the driving roller can be obtained by adjusting the air pressure of the air bearing. To surely generate a stable push-back force, it is preferable to interpose the lifting member by a pair of rollers.

Further, the balancer preferably comprises:

a piston connected to a lower end of the linear member located inside the lifting member; and a cylinder provided to the lifting member for housing the piston inside, and moves up-and-down relative to the piston by an air supplied to a cylinder chamber partitioned by the piston.

According to such configuration, the piston and the cylinder generate a push-up force that corresponds to the weight of the lifting member by supplying air to the cylinder chamber partitioned by the piston. It is a so-called air balance mechanism using air cylinders. This air balance mechanism has a simple configuration which is easy to handle and suitable for weight reduction.

The measuring machine according to the present invention comprises a moving mechanism for moving a probe, wherein the measuring machine includes the lifting drive device and the probe mounted onto the lifting member for measuring at least one of a position, an image and a shape of an object to be measured.

According to the lifting drive device of the present invention and the measuring machine comprising the same, the lifting member guided by the air bearing can be linearly moved with high precision to achieve swift lifting movement, and those suitable for structural simplification, weight reduction, and vibration countermeasure can be provided.

BEST MODE FOR CARRYING OUT THE INVENTION

Hereinbelow, embodiments of a Z-axis moving device, which is a lifting drive device, and a measuring machine using the same according to the present invention are described with reference to figures.

Figure 1:
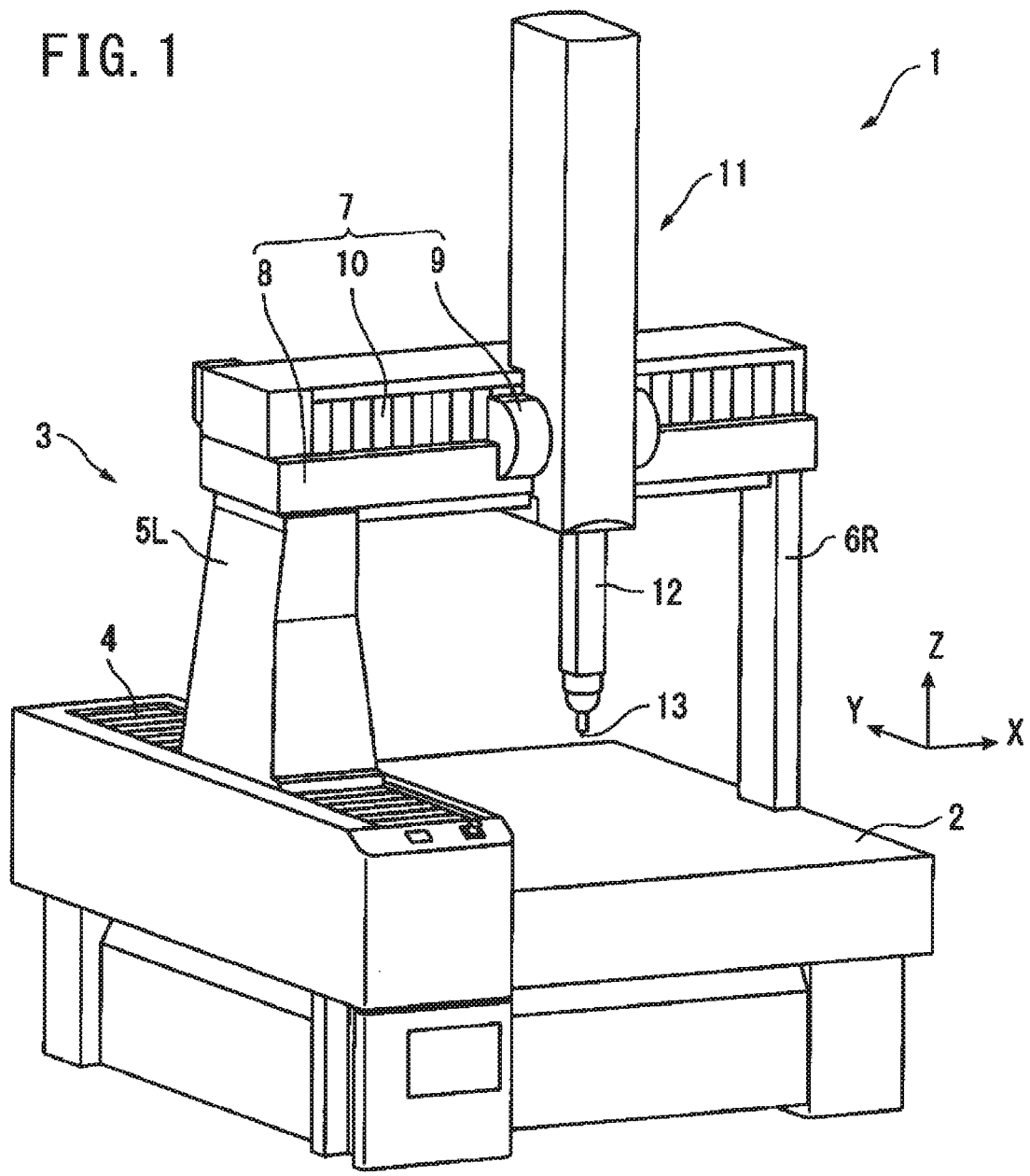
FIG. 1 shows an external appearance of the measuring machine according to a first embodiment of the present invention.

FIG. 1 shows a three-dimensional measuring machine according to the present embodiment. This three-dimensional measuring machine 1 comprises a base 2 for placing an object to be measured and a moving mechanism to move a probe 13. As this moving mechanism, the three-dimensional measuring machine 1 comprises a Y-axis moving device 3 for moving the probe 13 in Y-direction, an X-axis moving device 7 for moving the probe 13 in X-direction, and a Z-axis moving device 11 of the present embodiment for moving the probe 13 in Z-direction.

The base 2 is quadrangular pillar-shaped comprising a precisely flattened upper face for placing the object to be measured. Two directions that perpendicularly cross each other on the upper face of the base 2 is referred to as X-direction and Y-direction, respectively, and the direction vertical to the upper face of the base 2 to is referred to as Z-direction, for explanation. The Y-axis moving device 3 comprises a Y guide rail 4 provided on the base 2 in Y-direction, a left side part 5L of a Y slider provided to be movable along the Y guide rail 4, and a right side part 6R of the Y slider that moves on the base 2 in Y-direction in pair with the left side part 5L of the Y slider. Air bearings are provided between the Y guide rail 4 and the left side part 5L of the Y slider, and between the base 2 and the right side part 6R of the Y slider.

The X-axis moving device 7 comprises an X beam 8 that is a longitudinal guide member having its both ends supported by the left side part 5L and the right side part 6R of the Y slider, an X slider 9 that is a movable member provided to be movable along the longitudinal direction of the X beam 8, and an X slider driver 10 for moving the X slider 9. The X beam 8 is a long-beam shaped and has its both ends supported above the left side part 5L and the right side part 6R of the Y slider. When the Y-direction moving mechanism (Y-axis moving device 3) is slid in Y-direction, the X beam 8 is moved in Y-direction, too. The X slider 9 is provided to be slidable along the X beam 8. An air bearing is provided between the X slider 9 and the X beam 8.

Figure 2:
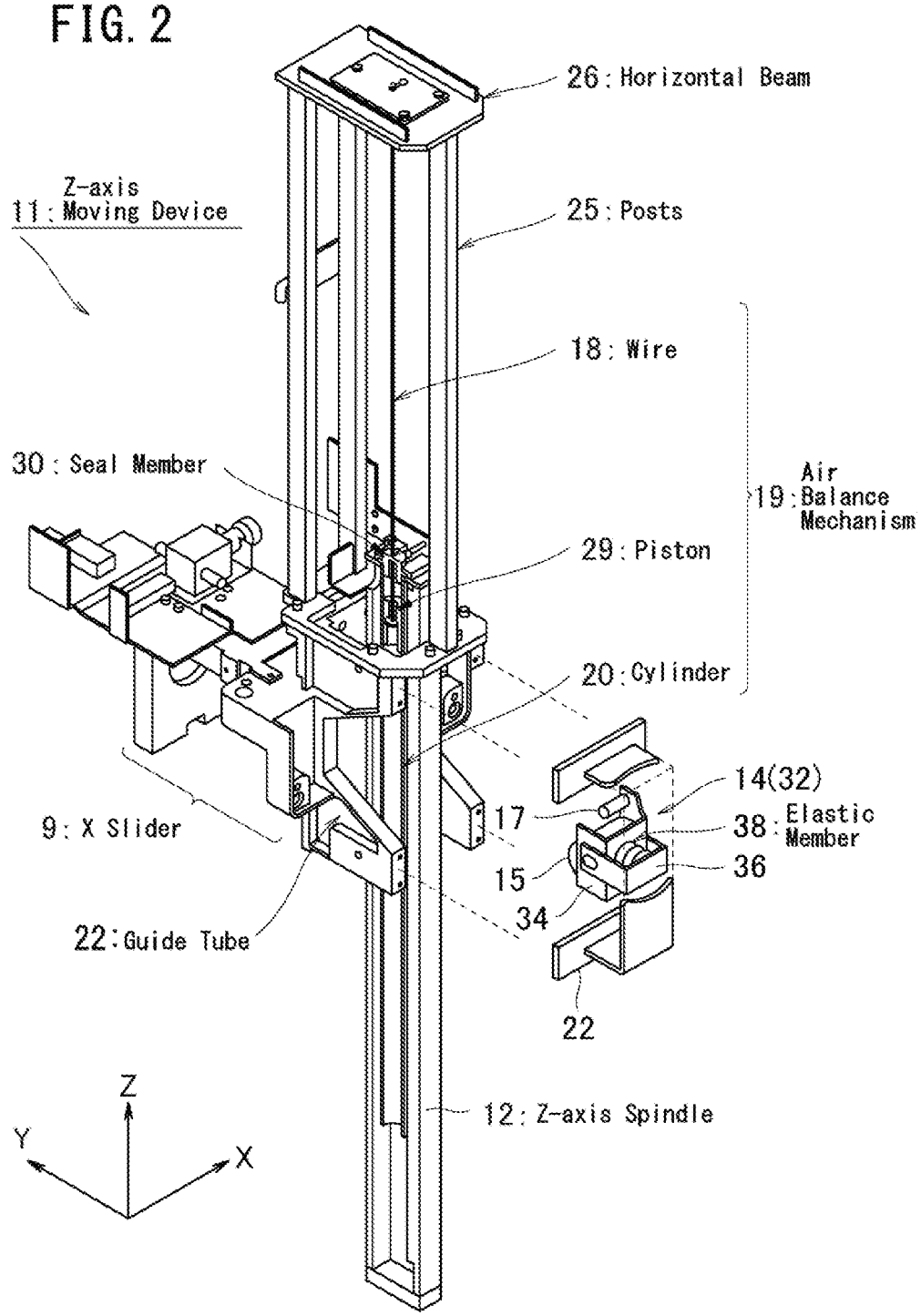
FIG. 2 is a partial cross section showing the inner structure of the Z-axis moving device of the first embodiment.

FIG. 2 shows the inner structure of the Z-axis moving device 11. The Z-axis moving device 11 comprises a guide tube 22 as a guide member supported by the X slider 9, and a Z-axis spindle 12 inserted in a vertical direction (Z-direction) relative to the guide tube 22 as a lifting member. The central axis of the guide tube 22 is provided along the Z-axis. Hereinbelow, specific configurations of the Z-axis moving device 11 are explained for each function.

<Air Bearing>

Figure 3:
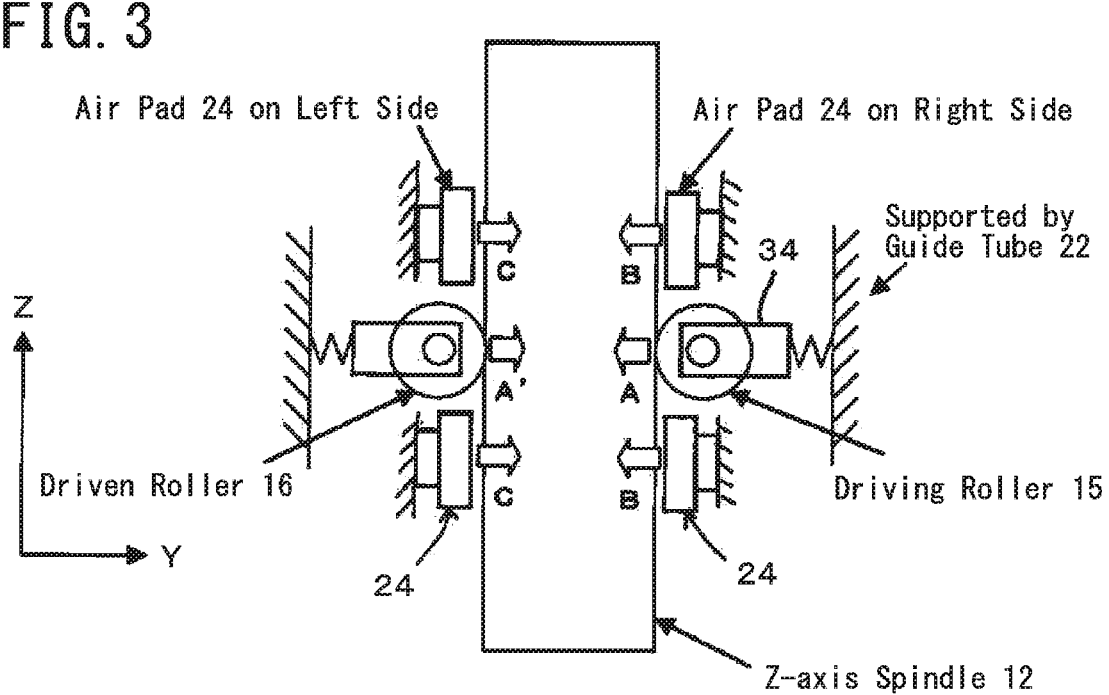
FIG. 3 schematically shows a direct friction drive mechanism of the first embodiment.

The guide face inside the guide tube 22 is formed by air jet surface of a plurality of air pads 24 arranged to surround the Z-axis spindle 12 from all directions (refer to FIG. 3). Compressed air from the air pads 24 is jetted towards the Z-axis spindle 12 to thereby form an air layer between the Z-axis spindle 12 and the air pads 24. The air pads 24 are arranged to face each other and interpose the Z-axis spindle 12 from X- and Y-directions, respectively, and in two tiers with an interval in Z-direction. Such configuration of the air bearing allows to maintain the non-contact state of the Z-axis spindle to the guide tube 22.

<Air Balance Mechanism>

Three posts 25 stand above the guide tube 22 and support a horizontal beam 26 thereabove. The horizontal beam 26 supports an upper end of a wire 18, and the wire 18 suspends the Z-axis spindle 12. The diameter of the wire is preferably from about 0.3 mm to about 10 mm, and more preferably from about 0.5 mm to about 3 mm. A wire having a diameter of about 1 mm is used in the present embodiment. The Z-axis spindle 12 is hollow, and a cylinder 20 is mounted therein. The central axis of the wire 18 and the center of the cylindrical part of the cylinder 20 are approximately in a straight line. The lower end of the wire 18 is coupled to the piston 29 inside the cylinder 20. An insert hole for the wire 18 is provided to the upper face of the cylinder 20, and airtightness inside the cylinder 20 is kept by a seal member 30.

The air balance mechanism 19 having such configuration floats the cylinder 20 when compressed air is supplied to a compression chamber inside the cylinder 20. This floatation acts in a direction to cancel the self-weight of the Z-axis spindle 12, so that a spindle drive mechanism, which will be described further below, can lift the Z-axis spindle 12 by a small driving force.

The air bearing and the air balance mechanism have portions that are in common with conventional configurations. However, the present embodiment largely differs from conventional configurations in the point that the member for suspending the Z-axis spindle 12 is changed to a wire from conventional support shafts.

<Direct Friction Drive Mechanism>

A direct friction drive mechanism 14 is adopted as a spindle drive mechanism in the present embodiment. FIG. 2 shows the mechanism partially disassembled. The driving roller 15 is arranged to be in contact with the surface of the Z-axis spindle 12 viewed from Y-direction. The driving roller 15 and its driving motor 17 are supported by the guide tube 22 via a mounting member 32.

The driving roller 15 is provided to push the surface of the Z-axis spindle 12 with a desired pushing force. Accordingly, the mounting member 32 comprises a supporting member 34 supporting the driving roller 15 and the motor 17, and a guide member 36 in Y-direction provided to the guide tube 22, so that the supporting member 34 slightly displaces in Y-direction by the guide member 36. Further, an elastic member 38 such as a spring is interposed between the supporting member 34 and the guide member 36, so that the supporting member 34 becomes biased in Y-direction. Consequently, the driving roller 15 pushes the surface of the Z-axis spindle 12 by the adjusted pushing force. The power of the motor 17 is transmitted to the rotation axis of the driving roller 15 by the transmission belt to rotate the driving roller 15.

As schematically shown in FIG. 3, the Z-axis spindle 12 receives another pushing force from the driven roller 16 provided at the side opposite to the driving roller 15. The pushing direction by the driven roller 16 is opposite to the pushing direction by the driving roller 15. By balancing the pushing forces of the pair of rollers 15, 16 interposing the spindle 12 and generating the friction force between the rollers 15, 16 and the surface of the spindle 12 caused by the driving of the driving roller 15, the Z-axis spindle 12 can be moved up-and-down. For example, the spring length of each roller 15, 16 and/or the air pressure of each air pad 24 may be finely adjusted to balance the sum of the pushing force A of the driving roller 15 and the air pushing forces B at the upper and lower sides, and the sum of the pushing force A' of the driven roller 16 and the pushing forces C of the air pads 24 opposing thereto.

Figure 4:
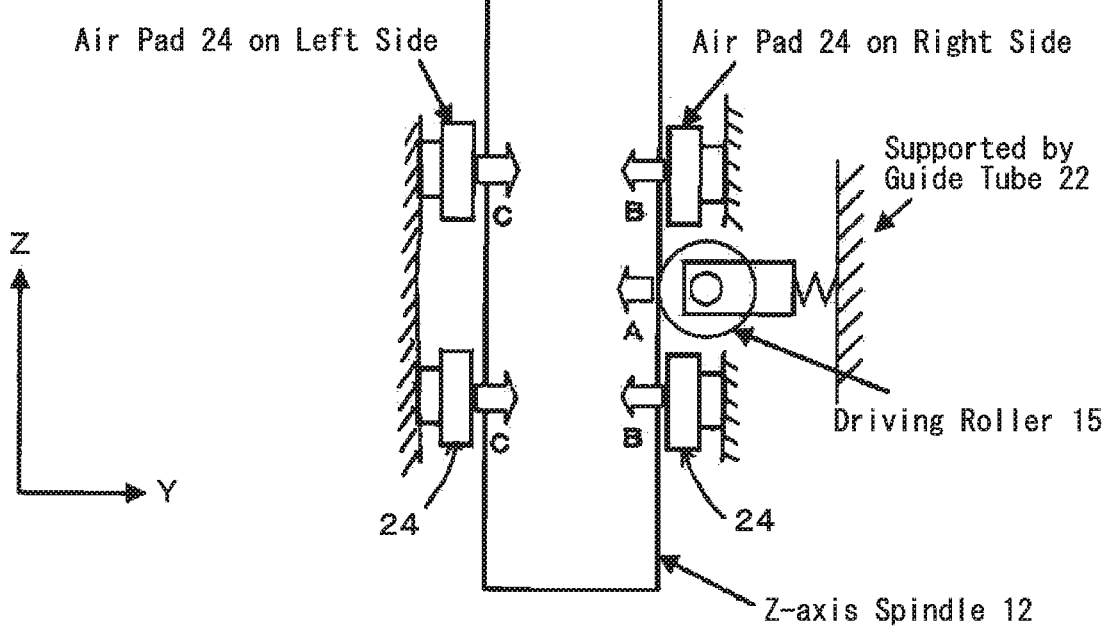
FIG. 4 schematically shows a modified example of the direct friction drive mechanism.
Figure 5:
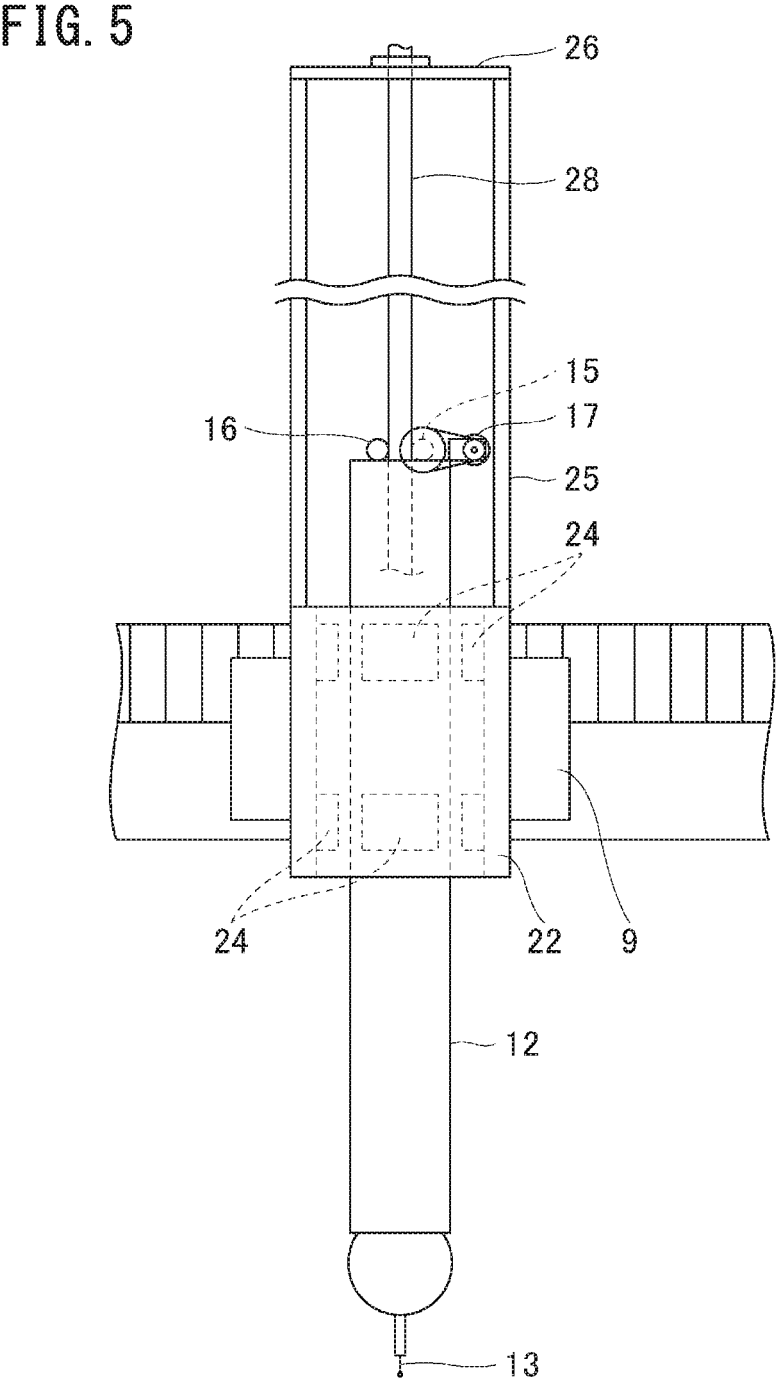
FIG. 5 shows a structure of the Z-direction drive mechanism for conventional measuring heads.

In the modified example of the direct friction drive mechanism shown in FIG. 4, the driven roller may not provided, and only the air pads 24 may be arranged at the opposite side of the driving roller 15 around the Z-axis spindle. In this case, the spring length of the roller 15 and/or the air pressure of each air pad 24 may be finely adjusted to balance the sum of the energizing force A of the driving roller 15 and the air pushing forces B at the upper and lower sides, and the sum of the pushing forces C of the air pads 24 opposing thereto.

Effects of the Z-axis moving device 11 and the three-dimensional measuring machine comprising the same of the present embodiment will now be described.

(1) An abrasion portion between the Z-axis spindle 12 and the guide tube 22 is eliminated by the air bearing, so that highly precise linear movement by the guide tube 22 can be maintained over a long period. Further, since the air balance mechanism 19 is comprised therein, the driving force required for lifting becomes small by an amount which the self-weight of the Z-axis spindle 12 is canceled. Accordingly, stable linear movement and swiftness in positioning can be maintained.

(2) As the spindle drive mechanism, the driving roller 15 for moving the spindle up-and-down by making friction force act directly on the Z-axis spindle 12 is adopted.

As an effect of such, first of all, limitation of the size of the suspension member for the Z-axis spindle 12 is eliminated, so that the flexible wire 18 having relatively small cross section became adoptable instead of a conventional rod having a large cross section. Further, in conventional rods, it was necessary to provide a thrust bearing at the upper end of the rod. The reason is that, conventionally, when the Z-axis spindle 12 is displaced in X-, Y-directions, the upper end of the hollow rod had to be displaceable accordingly, or otherwise vibrations generated in the Z-axis spindle 12 would be transmitted to the fixed side (the guide tube 22) and effects of the vibrations would spread. However, by adopting the wire 18 like the present invention, displacement of the Z-axis spindle 12 in X-, Y-directions is absorbed by the flexibility of the wire 18. Thus, the upper end of the wire 18 can be supported in a simple method. The thrust bearing is not required any longer, and number of components can be reduced accordingly.

Next, the Z-axis spindle 12 on the moving side does not hold the roller 15 and the driving motor 17, but the guide tube 22 on the fixed side (i.e. the X slider side) supports the roller 15 and the driving motor 17. Thus, the weight of the Z-axis spindle 12 can be reduced.

Further, a disadvantage of merely adopting the wire 18 is that the natural frequency of the Z-axis spindle 12 is reduced (generally, become easily vibrated). When the wire 18 is adopted as a coupling member of the Z-axis spindle 12 on the moving side to the guide tube 22 on the fixed side, rigidity of the Z-axis spindle 12 is lowered and the Z-axis spindle 12 become easily vibrated in all X-, Y-, Z-directions, compared to conventional rods. Moreover, in conventional rods, the upper end of the rod is supported by the thrust bearing, so that vibrations of the Z-axis spindle in X-, Y-directions were damped by the thrust bearing. If the wire 18 is merely adopted to eliminate the thrust bearing, the damping characteristic of such Z-axis spindle 12 will be deteriorated. However, in the present invention, the driving roller 15 for frictionally driving the Z-axis spindle 12 directly is adopted together with the wire 18, so that the driving roller 15 is kept in contact with the Z-axis spindle 12 at all times. Accordingly, generation of vibrations is suppressed, and damping effect of vibrations can be expected, too.

A rod having a smaller diameter (about 3 mm diameter) than conventional rods can be adopted as an alternative of the wire. In this case, the thrust bearing at the upper end of the rod is not required by elastic deformation of the small diameter rod. Other than this, effects similar to the above-mentioned (1) and (2) can be obtained.

INDUSTRIAL APPLICABILITY

Other than coordinate measuring machines, the present invention can be preferably used as other measuring machines such as an image measuring machine and a shape measuring machines, and vertical axis moving devices in optical devices such as microscopic measuring machines.

DESCRIPTION OF REFERENCE NUMBERS

1. Three-dimensional measuring machine (measuring machine)
11. Z-axis moving device (lifting drive device)
12. Z-axis spindle (lifting member)
13. Probe
14. Direct friction drive mechanism
15. Driving roller (roller)
16. Driven roller
17. Motor (rotation driver)
18. Wire (linear member)
19. Air balance mechanism (balancer)
20. Cylinder
22. Guide tube (guide member)
24. Air pad for air bearing
29. Piston

What is claimed is:

1. A lifting drive device of a lift guided by a guide via an air layer comprising:
    a linear structure extending upward from the lift and having its upper end supported by the guide;
    a balancer to enhance tension which acts on the linear structure to reduce an apparent weight of the lift suspended by the linear structure;
    at least one roller provided to the guide and in direct contact with the lift; and
    a rotation driver to rotate the at least one roller.

2. The lifting drive device according to claim 1, wherein the at least one roller is in a pair and arranged to interpose the lift.

3. A measuring machine comprising a mover mechanism to move a probe, wherein the measuring machine includes the lifting drive device according to claim 2, and the probe mounted onto the lift to measure at least one of a position, an image and a shape of an object to be measured.

4. The lifting drive device according to claim 1, wherein the balancer comprises:
    a piston connected to a lower end of the linear structure located inside the lift; and
    a cylinder provided to the lift to house the piston inside, and moves up-and-down relative to the piston by an air supplied to a cylinder chamber partitioned by the piston.

5. A measuring machine comprising a mover mechanism to move a probe, wherein the measuring machine includes the lifting drive device according to claim 4, and the probe mounted onto the lift to measure at least one of a position, an image and a shape of an object to be measured.

6. The lifting drive device according to claim 1, wherein the liner structure is a wire or a thin stick.

7. A measuring machine comprising a mover mechanism to move a probe, wherein the measuring machine includes the lifting drive device according to claim 6, and the probe mounted onto the lift to measure at least one of a position, an image and a shape of an object to be measured.

8. A measuring machine comprising a mover mechanism to move a probe, wherein the measuring machine includes the lifting drive device according to claim 1, and the probe mounted onto the lift to measure at least one of a position, an image and a shape of an object to be measured.

9. A lifting drive device of a lifting member guided by a guide member via an air layer comprising:
    a linear member extending upward from the lifting member and having its upper end supported by the guide member;
    a balancer for enhancing tension which acts on the linear member to reduce an apparent weight of the lifting member suspended by the linear member;
    at least one roller provided to the guide member and in contact with the lifting member; and
    a rotation driver for rotating the roller, wherein
    the balancer comprises:
    a piston connected to a lower end of the linear member located inside the lifting member; and
    a cylinder provided to the lifting member for housing the piston inside, and moves up-and-down relative to the piston by an air supplied to a cylinder chamber partitioned by the piston.

10. The lifting drive device according to claim 9, wherein the at least one roller is in a pair and arranged to interpose the lifting member.

11. The lifting drive device according to claim 9, wherein the liner member is a wire or a thin stick.

12. A measuring machine comprising a moving mechanism for moving a probe, wherein the measuring machine includes the lifting drive device according to claim 9, and the probe mounted onto the lifting member for measuring at least one of a position, an image and a shape of an object to be measured.

* * * * *